Figure 1:
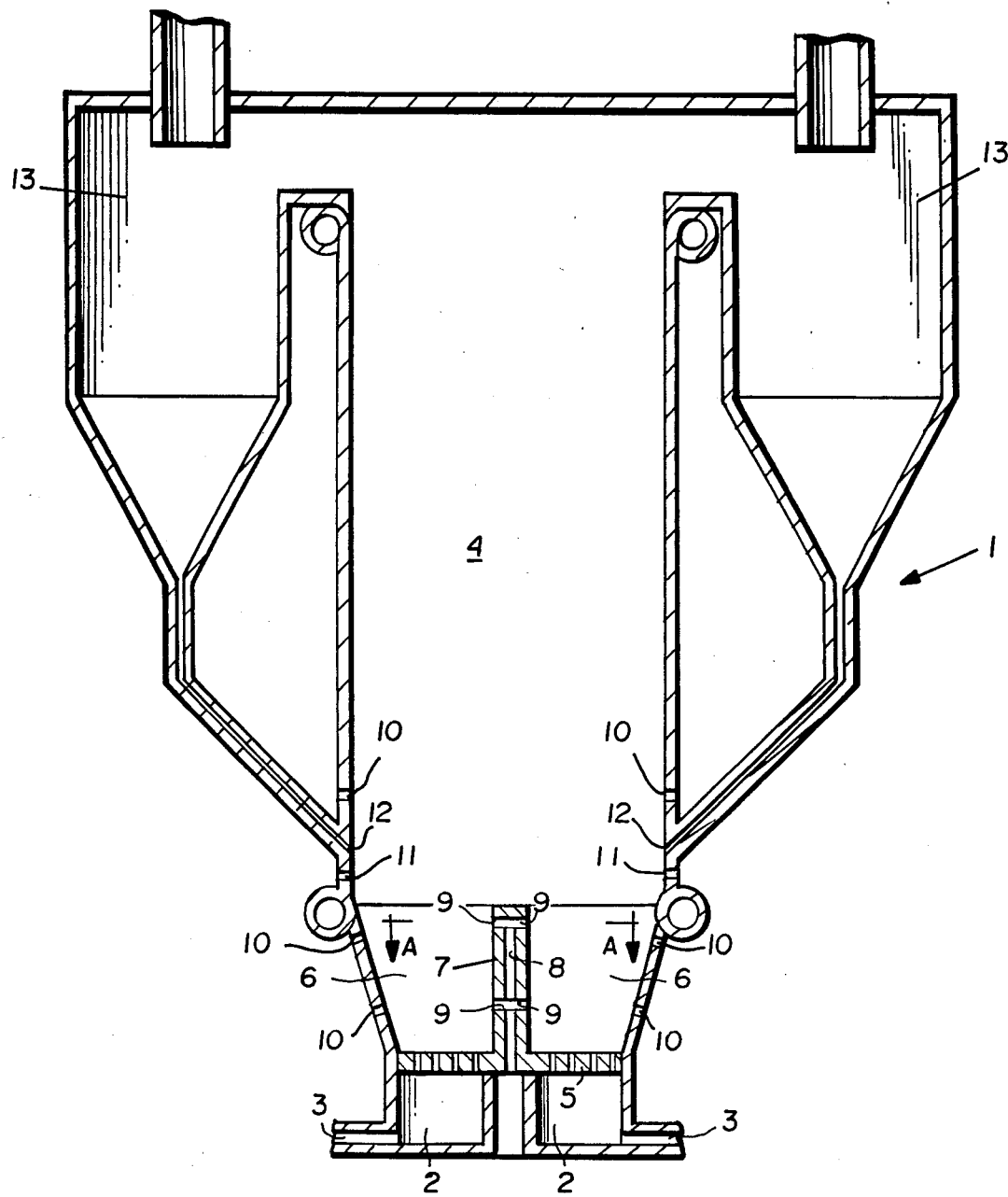

United States Patent [19]

Engström et al.

[11] Patent Number: 4,753,177
[45] Date of Patent: Jun. 28, 1988

[54] FLUIDIZED BED REACTOR

[75] Inventors: Folke Engström, San Diego, Calif.; Juhani Isaksson; Reijo Kuivalainen, both of Karhula, Finland

[73] Assignee: A. Ahlstrom Corporation, Karhula, Finland

[21] Appl. No.: 44,199

[22] Filed: Apr. 30, 1987

[30] Foreign Application Priority Data

Apr. 30, 1986 [FI] Finland .................................. 861806

[51] Int. Cl.⁴ ............................................. F23H 3/00
[52] U.S. Cl. .................................... 110/299; 34/57 A; 110/245; 110/300; 122/4 D; 165/104.16; 432/58
[58] Field of Search ............... 122/4 D; 110/245, 347, 110/263, 298-300; 431/7, 170; 165/104.16; 34/57 A; 432/58

[56] References Cited

U.S. PATENT DOCUMENTS

| 3,736,908 | 6/1973 | Erlich et al. | 122/4 D |
| 3,908,284 | 9/1975 | Beranek et al. | 165/104.16 X |
| 4,184,455 | 1/1980 | Talmud et al. | |
| 4,257,478 | 3/1981 | Stendahl | 165/104.16 |
| 4,330,502 | 5/1982 | Engstrom | 431/170 X |
| 4,338,283 | 7/1982 | Sakamoto et al. | 165/104.16 X |
| 4,552,097 | 11/1985 | Jarmuzewski | |
| 4,628,831 | 12/1986 | Delessard et al. | |

Primary Examiner—Edward G. Favors
Attorney, Agent, or Firm—Nixon & Vanderhye

[57] ABSTRACT

A fluidized bed reactor (1) comprising a reactor chamber (4) having a gas distributor plate (5) for feeding primary air, and a space above said distributor plate (5) is divided into compartments (6) by means of partition walls (7) having discharge openings (9) for feeding secondary air to the circulating bed.

19 Claims, 2 Drawing Sheets

FLUIDIZED BED REACTOR

The present invention relates to a fluidized bed reactor comprising a reactor chamber provided with a gas distributor plate, through which plate primary gas is fed into said chamber, and equipment for leading secondary gas to a space above said distributor plate.

Fluidized bed reactors are presently used for many different purposes such as, for example, combustion, gasification, and chemical and metallurgical processes because they are capable of e.g. producing an efficient contact between a gas and a material to be handled, high reaction speed, even temperature and good controllability of the process. The bigger the reactors though, the more problematic is the bringing about of stable process conditions and the control of changing process conditions. Big reactors are therefore often constructed in a way disclosed in e.g. U.S. Pat. No. 4,184,455, whereby the combustion chamber is divided by a tubular wall into compartments operating side by side, each said compartment being arranged with fuel and air supply systems of its own. In those reactors where, in addition of primary gas fed in through the gas distributor plate, secondary gas is fed to the space above said distributor plate, said operation mostly takes place through openings on the periphery of the combustion chamber. In big reactors where the distance between the wall of the combustion chamber and the center is great, even distribution of the secondary gas throughout the whole cross sectional surface is problematic. In circulating fluidized bed reactors bigger than 50-100 MW$_e$, the feed of secondary gas evenly throughout the bottom of the reactor cannot be accomplished as described above.

An example of a proposal for solving the problem is a method and apparatus for handling a fuel in a fluid bed as disclosed in FI patent application No. 833171, in which the primary gas is fed through holes at the bottom of tubes formed in the grate and the secondary gas fed through ducts running through the grate, said ducts terminating in the openings above said grate. Even distribution of the fluidizing air and the secondary air, however, calls for "excessive" pressure differences if the grate is big.

FI patent application No. 850708 discloses a steam boiler in which a fixed fluidized bed is divided into compartments by means of partition walls. Supply of secondary air is arranged above the compartments in a non-disclosed manner.

It is an object of the present invention to provide a solution by means of which the secondary gas in big fluidized bed reactors, operating on the principle of a circulating bed, can be fed in at different heights of the reactor and distributed in a desired manner on the cross sectional surface of the reactor.

The apparatus according to the invention is characterized in that the space above the gas distributor plate of the reactor chamber is divided into compartments by means of partition walls having discharge openings for secondary gas.

The present apparatus is of simple construction and may bring about, for example, the following advantages:

more efficient injection and thus better mixing of the secondary air, which results in more complete combustion and more efficient sulphur removal;

the NO$_x$-reduction is considerably better due to more even distribution of the secondary air;

the pressure difference over the distributor plate is more even, which results in more uniform fluidization.

Figure 2:
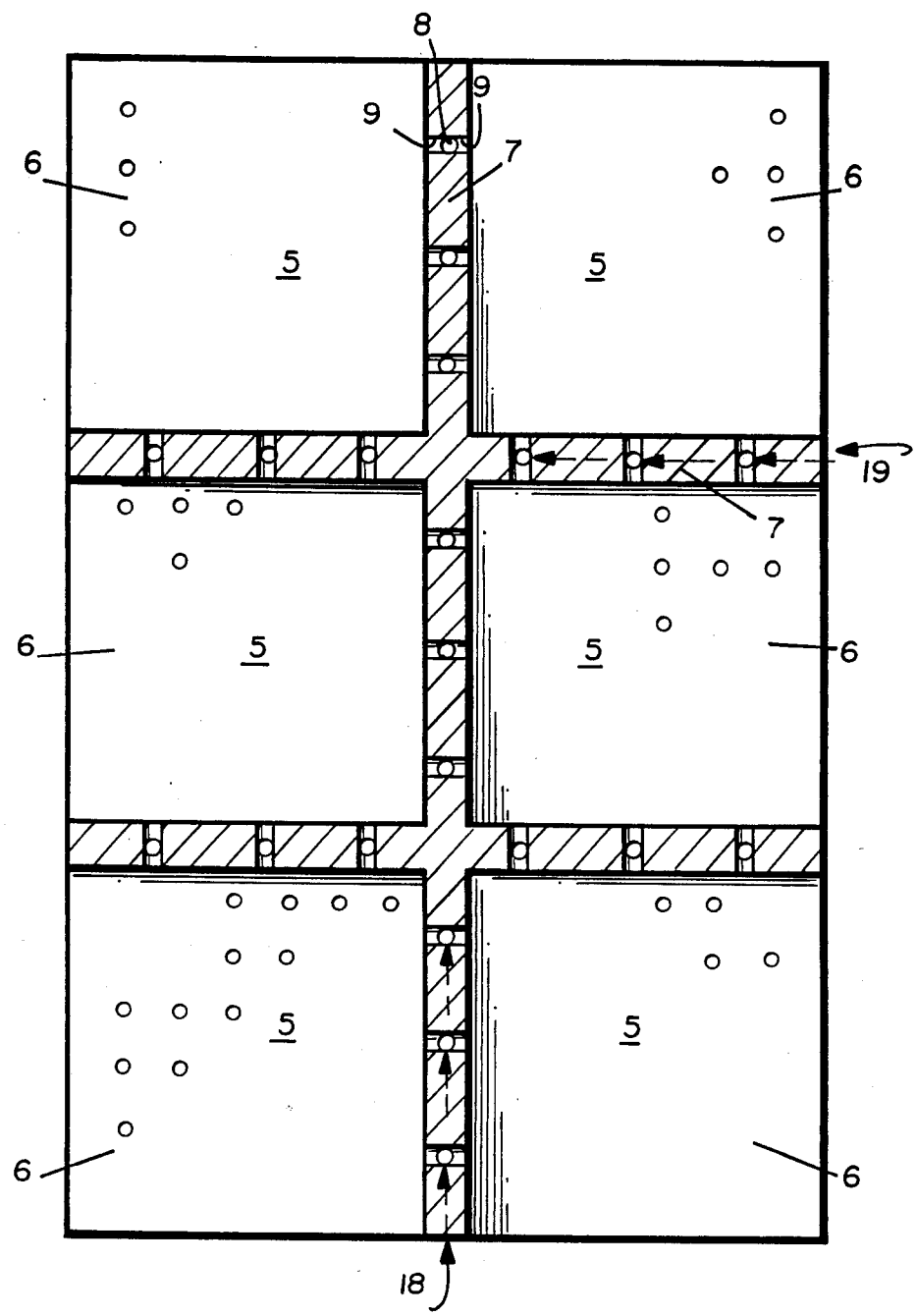

The invention will be described further, by way of example, with reference to the accompanying drawing, in which:

FIG. 1 is a vertical sectional view of the apparatus according to the invention, and FIG. 2 is an enlarged sectional illustration taken along line A—A of FIG. 1.

A circulating fluidized bed reactor 1 receives primary gas, such as air, through inlet openings 3 of air chambers or boxes 2 disposed at the bottom of the reactor 1. The air is then led through a gas distributor plate 5, disposed between a reactor chamber 4 and the air boxes 2, to the bottom of the reactor chamber 4. At the bottom of the reactor chamber 4 and on top of the distributor plate 5, there are partition walls 7, which divide the space above said distributor plate 5 into compartments 6, and said partition walls 7 have ducts 8 leading to discharge openings 9 for the supply of secondary gas such as, for example, air. The partition walls 7 extend to a height of 0.5 to 4 m, preferably 1.5 to 2.5 m, above the surface of the distributor plate 5. Secondary air is led into the reactor chamber 4 through the openings 9 in the partition walls 7 and also led through openings 10 in the walls surrounding the combustion chamber. The openings in the partition walls 7 have been arranged to form rows or lines at different heights such as at 0.6 and 2 m, for example. It is possible for openings 9 disposed at different heights in the partition walls 7 to be connected to different ducts 8, and for the ducts 8 to be connected to different air supply sources (as indicated schematically by reference arrows 18 and 19 in FIG. 2) so as to bring about a desired distribution of the secondary air in the vertical direction relative to the reactor. Furthermore, it is possible for the secondary air discharge openings 9 and 10 as well as the air box 2 of each compartment to be connected to air supply systems of their own so that the air supply to different compartments can be separately controlled (also as schematically illustrated by 18 and 19 in FIG. 2).

Fuel is fed into the reactor to the space above the partition walls 7 and solids separated from the flue gases in gas separators 13 are returned to the reactor through openings 11 and 12 in the walls of the reactor.

The invention is not intended to be in any way limited to the embodiment as described in the example, but different modifications and applications are possible without departing from the concept and scope of the invention as claimed in the following claims.

We claim:

1. A fluidized bed reactor comprising:

a reactor chamber;

a gas distributor plate disposed in said reactor chamber;

means for supplying primary gas to the reactor chamber through said gas distributor plate; and means for providing secondary gas to said reactor chamber above said distributor plate, said means comprising partition wall means which divide the space immediately above the gas distributor plate into compartments, and means defining discharge openings in said partition walls for the supply of secondary gas through the discharge openings into the compartments, said partition walls and the flow of secondary gas through the openings preventing particles from entering said partition means.

2. A reactor as recited in claim 1 wherein said partition walls extend to a height between 0.6–4 meters above the surface of said gas distributor plate.

3. A reactor as recited in claim 1 further comprising means for separately regulating the feed of secondary gas into different compartments defined by said partition walls.

4. A reactor as recited in claim 1 wherein said means for defining discharge openings in said partition walls define discharge openings at different heights in said partition walls so that the secondary gas is relatively uniformly distributed in said compartments.

5. A reactor as recited in claim 1 wherein said means defining said discharge openings in said discharge walls define openings in said openings in said partition walls at selected heights that open into each compartment defined by the partition wall in which said discharge openings are defined.

6. A method of supplying primary and secondary gas to a fluidized bed reactor which has a reactor chamber having a gas distributor plate disposed in the chamber, comprising the steps of:
(a) feeding primary gas into the reactor chamber through the gas distributor plate;
(b) separating the space above the gas distributor plate into a plurality of compartments defined by generally vertical walls;
(c) supplying secondary gas into each of the compartments at different heights along the vertical walls defining the compartments, the gas initially flowing into the compartments with a horizontal vector.

7. A method as recited in claim 6 wherein step (b) is practiced by providing vertical walls defining the compartments extending to a height of between 0.6–4 meters.

8. A method as recited in claim 6 wherein step (b) is practiced by providing vertical walls defining the compartments extending to a height of between 1.5–2.5 meters.

9. A method as recited in claim 6 comprising the further step of separately regulating the feed of secondary gas into the differential compartments.

10. A fluidized bed reactor comprising:
a reactor chamber;
a gas distributor plate disposed in said reactor chamber;
means for supplying primary gas to the reactor chamber through said gas distributor plate; and
means for providing secondary gas to said reactor chamber above said distributor plate, said means comprising partition wall means which divide the space immediately above the gas distributor plate into compartments, and means defining discharge openings in said partition walls for the supply of secondary gas through the discharge openings into the compartments, said partition walls extending to a height between 0.6–4 meters above the surface of said gas distributor plate.

11. A reactor as recited in claim 10 wherein said partition walls extend to a height of between 1.5–2.5 meters above the surface of said gas distributor plate.

12. A reactor as recited in claim 11 wherein said means for defining discharge openings in said partition walls define discharge openings at different heights in said partition walls so that the secondary gas is relatively uniformly distributed in said compartments.

13. A reactor as recited in claim 12 further comprising means for separately regulating the feed of secondary gas into different compartments defined by said partition walls.

14. A reactor as recited in claim 10 wherein said means for defining discharge openings in said partition walls define discharge openings at different heights in said partition walls so that the secondary gas is relatively uniformly distributed in said compartments.

15. A reactor as recited in claim 10 further comprising means for separately regulating the feed of secondary gas into different compartments defined by said partition walls.

16. A fluidized bed reactor comprising:
a reactor chamber;
a gas distributor plate disposed in said reactor chamber;
means for supplying primary gas to the reactor chamber through said gas distributor plate; and
means for providing secondary gas to said reactor chamber above said distributor plate, said means comprising partition wall means which divide the space immediately above the gas distributor plate into compartments, and means defining discharge openings in said partition walls for the supply of secondary gas through the discharge openings into the compartments;
said means for defining discharge openings in said partition walls defining discharge openings at different heights in said partition walls so that the secondary gas is relatively uniformly distributed in said compartments.

17. A fluidized bed reactor comprising:
a reactor chamber;
a gas distributor plate disposed in said reactor chamber;
means for supplying primary gas to the reactor chamber through said gas distributor plate; and
means for providing secondary gas to said reactor chamber above said distributor plate, said means comprising partition wall means which divide the space immediately above the gas distributor plate into compartments, and means defining discharge openings in said partition walls for the supply of secondary gas through the discharge openings into the compartments;
said means defining said discharge openings in said discharge walls defining openings in said partition walls at selected heights that open into each compartment defined by the partition wall in which said discharge openings are defined.

18. A reactor as recited in claim 17 further comprising means for separately regulating the feed of secondary gas into different compartments defined by said partition walls.

19. A method as recited in claim 7 including preventing the passage of particles through the vertical walls.

* * * * *